May 15, 1923.

C. F. AXELSON

SWING JAW CHUCK

Filed May 31, 1922

INVENTOR;
CHARLES F AXELSON,
BY
*Graham and Harris*
ATTORNEYS

Patented May 15, 1923.

1,455,017

UNITED STATES PATENT OFFICE.

CHARLES F. AXELSON, OF LOS ANGELES, CALIFORNIA, ASSIGNOR TO AXELSON MACHINE CO., A CORPORATION OF CALIFORNIA.

SWING-JAW CHUCK.

Application filed May 31, 1922. Serial No. 564,995.

*To all whom it may concern:*

Be it known that I, CHARLES F. AXELSON, a citizen of the United States, residing at Los Angeles, in the county of Los Angeles, State of California, have invented a new and useful Swing-Jaw Chuck, of which the following is a specification.

My invention relates to lathe tools and equipment and particularly to lathe chucks from which deformed stock, such as sucker rods used for oil pumping, may be quickly removed.

Sucker rods, of the class above mentioned, are usually provided with enlarged ends to provide squared portions suited to be gripped by a wrench and increased diameters of thread engagement so that joints will be formed having strength equal to or greater than the bar from which the sucker rods are made. The machine work required in threading and finishing up the ends of the rods necessitates their being held and revolved in a lathe chuck during this operation. Much time and labor is consumed in handling such rods with the standard type of lathe chucks, owing to the enlarged ends of the rods, which make it necessary to open the chuck jaws to an extent which will permit the enlargements to pass through.

It is the principal object of my invention to provide a chuck for holding articles of the class described which may be quickly opened and closed, thus increasing the speed of production and correspondingly reducing the cost thereof.

Other objects and advantages will be made evident hereinafter.

I attain the objects of my invention by the use of chuck jaws which are adapted to be pivotally mounted upon the jaw blocks of any of the standard chucks, and by the use of means which may be conveniently operated to swing the jaws into active or inactive position.

Referring to the drawing, which is for illustrative purposes only,

Figure 1:
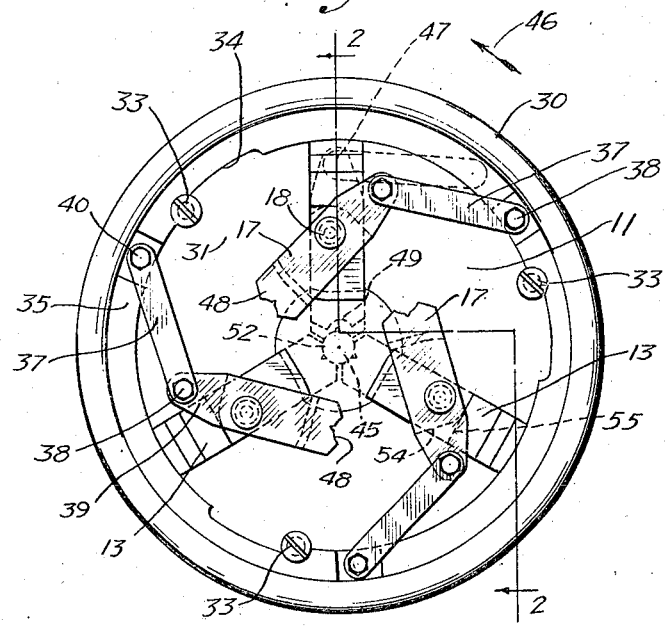
Fig. 1 is a face view of a chuck embodying my invention, the pivoted jaws being shown therein in their inactive position.

In the illustration of my invention, I employ a universal chuck 11. Although this chuck is of the scroll feed type, my invention may be employed with any of the standard types of chucks. Instead of the standard type of chuck jaw, I employ a jaw block 13 which operates in the radial grooves 14 and which is engaged by the scroll plate 15 for the purpose of moving these blocks 13 radially inwardly or outwardly. Upon each of the blocks 13 a jaw member 17 is pivoted by means of a shouldered screw pin 18, this pin being principally a pivot upon which the jaw member 17 may rotate and not intended to carry the stresses to which the jaws are subjected when gripping a sucker rod 20 for purposes of machining.

Figure 2:
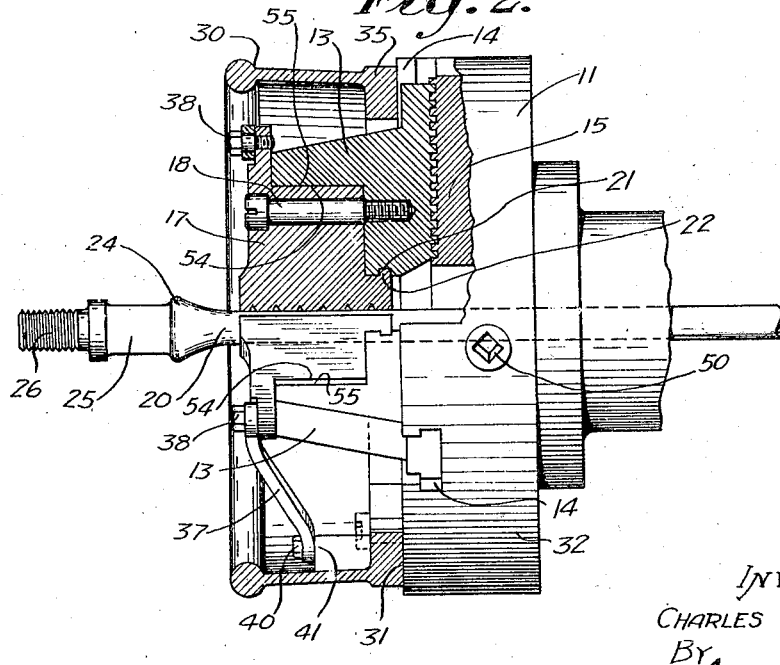
Fig. 2 is an elevation of the chuck with a sucker rod held therein, a portion of the chuck being shown in section on a plane indicated by the line 2—2 of Fig. 1.

A groove 21 formed in the inner ends of each of the blocks 13 receives the extension 22 provided upon each of the jaw members 17. This engagement between the members 13 and 17 prevents an outwardly movement of the jaw member 17 when pressure is brought to bear thereby upon the stock gripped between the chuck jaws. The class of work to which my invention is adapted is particularly the sucker rod 20, which has enlarged ends 24 substantially twice the diameter of the stock from which the rod is formed; this enlargement provides a squared portion 25 for the application of suitable wrenches in the joining of the sucker rod and also a threaded portion 26 providing screw engagement between the sucker rods and coupling members. In order to place the sucker rod 20 in an ordinary chuck, it is necessary to open the jaws of the chuck sufficiently to permit one of the enlarged ends to be passed therethrough. It is then necessary to screw the jaws in against the shank portion of the sucker rod in order to grip same centrally and with sufficient firmness to enable the ends to be properly machined. In order to eliminate the greater portion of the time now lost in opening and closing the chuck jaws, my invention permits the members 17 to be swung into the open position in which they are shown in Fig. 1, thus providing ample space through which to pass the enlarged end 24 of the sucker rod 20. The displacement of the members 17 into the inactive positions in which they are shown, is accomplished by a hand wheel 30 which is rotatably mounted upon the face 31 of the head 32 enclosing the chuck 11. This ring is mounted around a trio of machine screws 33 which engage recesses 34 provided in the flange 35 thereof, these recesses permitting the ring to be rotated by hand sufficiently to throw the member 17 into the inactive position shown, this being accomplished by means of links 37 which pivot upon screws 38 in the outer ends 39 of the jaw member 17 and upon screws 40 which engage the ring member, as shown at 41 in Fig. 2.

In the description of the operation of the device, we will consider that the jaw members 17 are disposed in open or active position as shown in Fig. 1. A sucker rod is placed through the lathe spindle and allowed to extend through the chuck as indicated by the dotted lines 45. The hand wheel 30 is then rotated in the direction indicated by the arrow 46, which rotation, through the medium of the links 37, throws the jaw members 17 into aligned or active position, as indicated by the dotted lines 47, only one of the jaws being shown in this position for the sake of simplicity in illustration. The gripping faces 48 of the jaw member 17 are then in the position indicated in dotted lines at 49, whereupon the jaw blocks 13 may then be advanced inwardly to tighten the jaws upon the sucker rod by rotating the scroll 15 which is accomplished by the use of a wrench in one of the sockets 50 provided for this purpose. The gripping faces 48 are shown fragmentarily in engagement with the sucker rod by dotted lines 52 in Fig. 1.

It will be perceived that the pins 18 are situated slightly to the side of the radial axis of each of the jaw blocks 13 so that when gripping pressure is brought to bear upon the members 17 by advancing the blocks 13, the face 54 of the member 17 will be held firmly against the face 55 provided by the block 13, thus overcoming any tendency for the jaws 17 to swing out of their active positions of alignment. To remove the sucker rod from the chuck, it is merely necessary to loosen up the jaw blocks 13 by a slight rotation of the scroll plate 15 and to then swing the jaws 17 into inactive position by rotating the hand wheel 30 in a direction opposite to that indicated by the arrow 46. Although I use this device particularly for the machining of sucker rods, as herein described, it will be seen that its use is adapted to the machining of various other articles and that it is particularly valuable in such instances wherein the stock to be machined has enlargements formed thereupon.

I claim as my invention:

1. In a device of the class described, the combination of: a plurality of radially disposed jaw blocks; means for imparting radial movement to said blocks; jaw members pivoted on said blocks; a ring member mounted exteriorly of said jaw members, said ring member being provided with means for manually gripping same; and links operatively disposed between said ring and said jaw members whereby said jaw members may be swung between their active and inactive positions.

2. In a device of the class described, the combination of: a head; a plurality of radially disposed jaw blocks supported by said head; means for imparting movement to said jaw blocks; jaw members pivotally mounted upon said jaw blocks; a ring member rotatably mounted upon said head; and links operatively disposed between said ring member and said jaw members whereby said jaw members may be swung between their active and inactive positions.

3. In a device of the class described, the combination of: a head; a plurality of radially disposed jaw blocks supported by said head; means for imparting movement to said jaw blocks; jaw members pivotally mounted upon said jaw blocks; a ring member rotatably mounted upon said head exteriorly of said jaw members; and links operatively disposed between said ring member and said jaw members whereby said jaw members may be swung between their active and inactive positions.

4. In a device of the class described, the combination of: a head; a plurality of radially disposed jaw blocks supported by said head; means for imparting movement to said jaw blocks; jaw members pivotally mounted upon said jaw blocks; a ring member rotatably mounted upon said head exteriorly of said jaw members; and links connecting between the outer ends of said jaw members and said ring member whereby said jaw members may be swung between their active and inactive positions.

In testimony whereof, I have hereunto set my hand at Los Angeles, California, this 24th day of May, 1922.

CHARLES F. AXELSON.